United States Patent
Chan et al.

(10) Patent No.: US 7,433,209 B2
(45) Date of Patent: Oct. 7, 2008

(54) SOFT-SWITCHING DC/DC CONVERTER HAVING RELATIVELY BETTER EFFECTIVENESS

(75) Inventors: Chih-Chiang Chan, Taoyuan Hsien (TW); Yu-Ming Chang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 169 days.

(21) Appl. No.: 11/443,786

(22) Filed: May 31, 2006

(65) Prior Publication Data

US 2007/0007933 A1   Jan. 11, 2007

(30) Foreign Application Priority Data

Jul. 5, 2005   (TW) ............................... 94122765 A

(51) Int. Cl.
  *H02M 3/335* (2006.01)
(52) U.S. Cl. ..................... 363/21.02; 323/235
(58) Field of Classification Search ................ 323/222, 323/223, 226, 266, 282, 235, 238; 363/16, 363/95, 97, 131, 21.02, 22, 89
  See application file for complete search history.

(56) References Cited

U.S. PATENT DOCUMENTS

| | | | |
|---|---|---|---|
| 5,418,704 A * | 5/1995 | Hua et al. | 323/282 |
| 5,594,635 A * | 1/1997 | Gegner | 363/124 |
| 6,236,191 B1 * | 5/2001 | Chaffai | 323/225 |
| 6,366,476 B1 * | 4/2002 | Yasumura | 363/21.02 |
| 6,465,991 B1 * | 10/2002 | Chang | 323/222 |
| 6,987,675 B2 | 1/2006 | Jovanovic et al. | |
| 2003/0210019 A1 * | 11/2003 | Chan et al. | 323/222 |
| 2006/0176034 A1 * | 8/2006 | Skinner | 323/282 |
| 2006/0209575 A1 * | 9/2006 | Archer | 363/22 |
| 2006/0220591 A1 * | 10/2006 | Marchand et al. | 315/209 R |

FOREIGN PATENT DOCUMENTS

CN   1574582 A   2/2005

* cited by examiner

Primary Examiner—Jeffrey L. Sterrett
Assistant Examiner—M'Baye Diao
(74) Attorney, Agent, or Firm—Volpe and Koenig, P.C.

(57) ABSTRACT

The proposed soft-switching DC/DC converter includes a converter circuit including a main switch having a first, a second and a control terminals for converting an input DC voltage to an output DC voltage, a resonant circuit electrically connected to the converter circuit, and an energy transferring circuit including an auxiliary switch having a first, a second and a control terminals and magnetically coupled to the resonant circuit. In which, the main switch is turned on under a specific voltage across the first and the second terminals of the main switch and the auxiliary switch is turned off under a specific current flowing through the first and the second terminals of the auxiliary switch both controlled by the resonant circuit through a resonance effect so as to accomplish a soft-switching of the converter.

19 Claims, 10 Drawing Sheets

SOFT-SWITCHING DC/DC CONVERTER HAVING RELATIVELY BETTER EFFECTIVENESS

FIELD OF THE INVENTION

The present invention relates to a PWM DC/DC converter circuit. More specifically, this invention relates to a soft-switching DC/DC converter, which employs the zero-voltage switching (ZVS) and the zero-current switching (ZCS) technologies.

BACKGROUND OF THE INVENTION

Please refer to FIG. 1, which shows the schematic circuit diagram of a conventional PWM buck DC/DC converter in the prior art. In FIG. 1, the buck DC/DC converter 100 includes a switch 101, an input capacitor 102, a main choke 103, a main diode 104, an output capacitor 105 and a load, and an input DC voltage V1 is lowered to make an output DC voltage V2 generated on the load through turning on and off of the switch 101.

The operational principles of the buck DC/DC converter 100 of FIG. 1 are that the input DC voltage V1 is employed to charge the main choke 103 and the output capacitor 105 to store the electrical energy and the main diode 104 is turned off due to a reverse bias voltage when the switch 101 is turned on firstly. The main diode 104 is turned on and the energy stored in the main choke 103 is employed to charge the output capacitor 105 when the switch 101 is turned off secondly. And the switch 101 is turned on and off periodically so as to make the output DC voltage V2 generated on the load thirdly.

The operational principles of the buck DC/DC converter 100 of FIG. 1 are that the input DC voltage V1 is employed to charge the main choke 103 and the output capacitor 105 to store the electrical energy and the main diode 104 is turned off due to a reverse bias voltage when the switch 101 is turned on firstly. The main diode 104 is turned on and the energy stored in the main choke 103 is employed to charge the output capacitor 105 when the switch 101 is turned off secondly. And the switch 101 is turned on and off periodically so as to make the output DC voltage V2 generated on the load thirdly.

Theoretically, if the capacitance of the output capacitor 105 is relatively quite large, then the switch 101 would be turned on and off quickly and periodically to accumulate the energy in the main choke 103 so as to supplement the energy on the output capacitor 105 at any time as shown in FIG. 1. Thus, the voltage across the output capacitor 105 will be maintained at a fixed value and won't be influenced by the variation of the load.

However, the buck DC/DC converter 100 has at least two drawbacks:

(1) The reverse recovery current on the main diode 104 will make the switch 101 and the main diode 104 produce serious switching losses when the switch 100 is turned on and off such that the size of the main choke 103 of the buck DC/DC converter 100 could not be lowered down through increasing the switching frequency.

(2) The voltages and currents of the switch 101 and the main diode 104 vary dramatically during the switching procedures, which will cause the EMI/RFI problems.

Keeping the drawbacks of the prior arts in mind, and employing experiments and research full-heartily and persistently, the applicant finally conceived the soft-switching DC/DC converter having relatively better effectiveness.

SUMMARY OF THE INVENTION

It is therefore an object of the present invention to propose a soft-switching DC/DC converter having relatively better effectiveness for decreasing the switching losses of the converter and the EMI/RFI of the converter.

According to the first aspect of the present invention, the soft-switching DC/DC converter includes a converter circuit including a main switch having a first, a second and a control terminals for converting an input DC voltage to an output DC voltage, a resonant circuit electrically connected to the converter circuit, and an energy transferring circuit including an auxiliary switch having a first, a second and a control terminals and magnetically coupled to the resonant circuit, in which the main switch is turned on under a specific voltage across the first and the second terminals of the main switch and the auxiliary switch is turned off under a specific current flowing through the first and the second terminals of the auxiliary switch both controlled by the resonant circuit through a resonance effect so as to accomplish a soft-switching of the converter.

Preferably, the main switch includes a transistor.

Preferably, the auxiliary switch includes a transistor.

Preferably, the converter circuit includes a buck converter.

Preferably, the buck converter includes the main switch, an input capacitor having a first and a second terminals, an inductor having a first and a second terminals, a diode having an anode and a cathode and an output capacitor having a first and a second terminals, the first terminal of the main switch is electrically connected to the first terminal of the input capacitor, the first terminal of the inductor is electrically connected to the second terminal of the main switch and the cathode of the diode, the second terminal of the inductor is electrically connected to the first terminal of the output capacitor, and the anode of the diode is electrically connected to the second terminals of the input and the output capacitors.

Preferably, the converter circuit includes a boost converter.

Preferably, the boost converter includes the main switch, an input capacitor having a first and a second terminals, an inductor having a first and a second terminals, a diode having an anode and a cathode and an output capacitor having a first and a second terminals, the first terminal of the inductor is electrically connected to the first terminal of the input capacitor, the first terminal of the main switch is electrically connected to the second terminal of the inductor and the anode of the diode, the second terminal of the main switch is electrically connected to the second terminals of the input and the output capacitors, and the cathode of the diode is electrically connected to the first terminal of the output capacitor.

Preferably, the converter circuit includes a buck-boost converter.

Preferably, the buck-boost converter includes the main switch, an input capacitor having a first and a second terminals, an inductor having a first and a second terminals, a diode having an anode and a cathode and an output capacitor having a first and a second terminals, the first terminal of the main switch is electrically connected to the first terminal of the input capacitor, the first terminal of the inductor is electrically connected to the second terminal of the main switch and the cathode of the diode, the second terminal of the inductor is electrically connected to the second terminal of the input capacitor and the first terminal of the output capacitor, and the anode of the diode is electrically connected to the second terminal of the output capacitor.

Preferably, the soft-switching DC/DC converter further includes a first and a second input terminals, a first and a second output terminals and a transformer having a primary winding with a first and a second terminals and a secondary winding with a first and a second terminals, wherein the first terminal of the main switch is electrically connected to the first input terminal, and the converter circuit is electrically connected to the second input terminal and the first and the second output terminals.

Preferably, the resonant circuit includes the secondary winding of the transformer, a resonant inductor having a first and a second terminals, a resonant diode having an anode and a cathode and a flywheel diode having an anode and a cathode, the first terminal of the secondary winding is electrically connected to the cathode of the flywheel diode and the first terminal of the inductor, the second terminal of the inductor is electrically connected to the second terminal of the main switch, the second terminal of the secondary winding is electrically connected to the cathode of the resonant diode, and the anode of the resonant diode is electrically connected to the anode of the flywheel diode and the second input and the second output terminals of the converter.

Preferably, the energy transferring circuit further includes the primary winding of the transformer, a clamping diode having an anode and a cathode, a clamping capacitor having a first and a second terminals and a discharging resistor having a first and a second terminals, the first terminal of the discharging resistor is electrically connected to the first input terminal, the first terminal of the clamping capacitor and the first terminal of the primary winding, the second terminal of the discharging resistor is electrically connected to the second terminal of the clamping capacitor and the cathode of the clamping diode, the anode of the clamping diode is electrically connected to the first terminal of the auxiliary switch and the second terminal of the primary winding, and the second terminal of the auxiliary switch is electrically connected to the second input and the second output terminals of the converter.

Preferably, the energy transferring circuit includes a dual switch forward DC/DC converter.

Preferably, the dual switch forward DC/DC converter includes a pair of switches, a first switch being the auxiliary switch and a second switch having a first, a second and a control terminals, a first diode having an anode and a cathode, a second diode having an anode and a cathode and the primary winding of the transformer, the anode of the first diode is electrically connected to the second terminal of the first switch and the second input and the second output terminals of the converter, the cathode of the first diode is electrically connected to the second terminal of the second switch and the first terminal of the primary winding, the second terminal of the primary winding is electrically connected to the anode of the second diode and the first terminal of the first switch, and the cathode of the second diode is electrically connected to the first input terminal of the converter and the first terminal of the second switch.

Preferably, the energy transferring circuit is electrically connected to the first and the second output terminals of the converter in parallel.

Preferably, the energy transferring circuit includes a push-pull DC/DC converter.

Preferably, the energy transferring circuit includes a full-bridge DC/DC converter.

Preferably, the specific voltage is zero volt.

Preferably, the specific current is one close to zero amp.

According to the second aspect of the present invention, the soft-switching DC/DC converter includes a converter circuit including a main switch for converting an input DC voltage to an output DC voltage, a resonant circuit electrically connected to the converter circuit, and an energy transferring circuit including an auxiliary switch magnetically coupled to the resonant circuit, in which the main switch is turned on under a specific voltage and the auxiliary switch is turned off under a specific current both controlled by the resonant circuit through a resonance effect so as to accomplish a soft-switching of the converter.

The present invention may best be understood through the following descriptions with reference to the accompanying drawings, in which:

DETAILED DESCRIPTION OF THE PREFERRED EMBODIMENT

Figure 2:
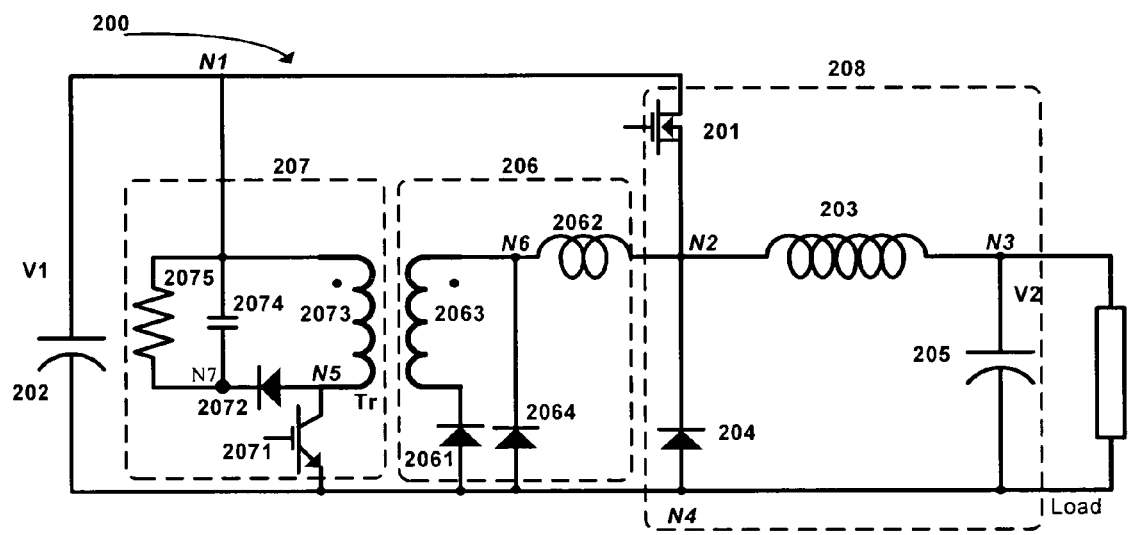
FIG. 2 is the schematic circuit diagram of the first preferred embodiment of the soft-switching DC/DC converter of the present invention.

Please refer to FIG. 2, which shows the schematic circuit diagram of the first preferred embodiment of the soft-switching DC/DC converter of the present invention. In FIG. 2, the proposed soft-switching DC/DC converter 200 includes the buck DC/DC converter 208, the resonant circuit 206 and the energy transferring circuit 207.

The proposed soft-switching DC/DC converter 200 is electrically connected to the input DC voltage V1, the main switch 201 is turned on and off to lower down the input DC voltage V1 so as to make the output DC voltage V2 generated on the load as shown in FIG. 2.

In FIG. 2, the buck DC/DC converter 208 includes a main switch 201, an input capacitor 202, a main choke 203, a main diode 204 and an output capacitor 205. Therein, the first terminal of the main switch 201 is electrically connected to the input DC voltage V1 at the node N1, the first terminal of the main choke 203 is electrically connected to the second terminal of the main switch 201 and the cathode of the main diode 204 at the node N2, the second terminal of the main choke 203 is electrically connected to the first terminal of the output capacitor 205 at the node N3, which is employed as one output terminal for outputting DC voltage V2, and the anode of the main diode 204 is electrically connected to the second terminals of the input capacitor 202 and the output capacitor 205 at the node N4, which is employed as the other output terminal for outputting DC voltage V2.

In the buck DC/DC converter 208, the input DC voltage V1 is employed to charge the main choke 203 and the output capacitor 205 when the main switch 201 is turned on and the main diode 204 is turned off due to a reverse bias voltage firstly. The main diode 204 is turned on and the energy stored in the main choke 203 is employed to charge the output capacitor 205 when the main switch 201 is turned off secondly. And the main switch 201 is turned on and off periodically so as to make the output DC voltage V2 generated on the load thirdly.

Besides, the resonant circuit 206 includes a resonant diode 2061, a resonant inductor 2062, a secondary winding 2063 of a transformer Tr and a flywheel diode 2064. The resonant circuit 206 is employed to turn on the main switch 201 of the buck DC/DC converter 208 under a zero-voltage condition.

In the resonant circuit 206, the anode of the resonant diode 2061 is electrically connected to the second terminal of the output capacitor 205, the anode of the main diode 204 and the anode of the flywheel diode 2064 at the node N4, and the cathode of the resonant diode 2061 is electrically connected to the second terminal of the secondary winding 2063 of the transformer Tr, the first terminal of the secondary winding 2063 of the transformer Tr is electrically connected to the cathode of the flywheel diode 2064 and the first terminal of the resonant inductor 2062 at the node N6, and the second terminal of the resonant inductor 2062 is electrically connected to the second terminal of the main switch 201 at the node N2.

Furthermore, the energy transferring circuit 207 includes the auxiliary switch 2071, the clamping diode 2072, the primary winding 2073 of the transformer Tr, the clamping capacitor 2074 and the discharging resistor 2075.

The first terminal of the auxiliary switch 2071 is electrically connected to the second terminal of the primary winding 2073 of the transformer Tr and the anode of the clamping diode 2072 at the node N5, the second terminal of the auxiliary switch 2071 is electrically connected to the node N4, the first terminal of the primary winding 2073 of the transformer Tr is electrically connected to the first terminals of the clamping capacitor 2074 and the discharging resistor 2075 at the node N1, and the cathode of the clamping diode 2072 is electrically connected to the second terminals of the clamping capacitor 2074 and the discharging resistor 2075 at the node N7.

Please refer to FIGS. 3(a) to 3(h), which are the schematic circuit diagrams showing the operational modes of the first preferred embodiment of the soft-switching DC/DC converter of the present invention respectively. The main operational principles of the first preferred embodiment of the proposed soft-switching DC/DC converter 200 of the present invention of FIG. 3 are divided into 7 operational modes (Mode 0 to Mode 6 respectively, and back to Mode 0 after Mode 6 for a new cycle) according to the switching principles and sequence of the switches, and the operational principles are explained according to FIGS. 3(a) to 3(h) as follows.

(1) Mode 0

Figure 1:
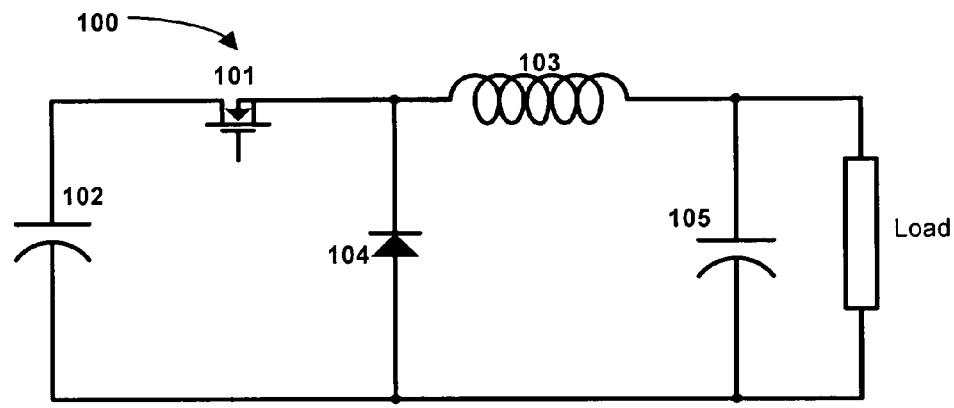
FIG. 1 is the schematic circuit diagram of a conventional PWM buck DC/DC converter in the prior art.
Figure 3A:
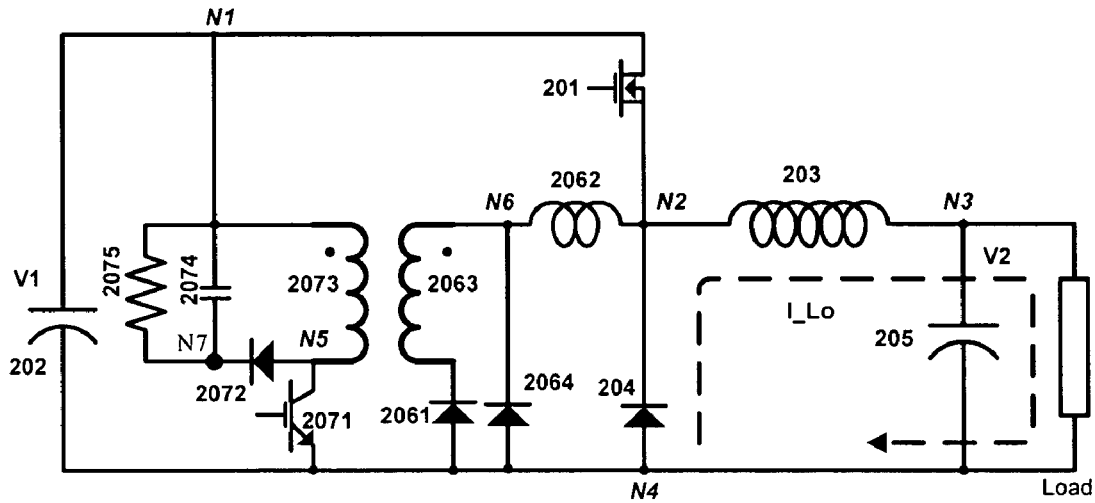
FIGS. 3(a) to 3(h) are the schematic circuit diagrams showing the operational modes of the first preferred embodiment of the soft-switching DC/DC converter of the present invention respectively.

This mode is the same as the discharge mode of the aforementioned conventional PWM buck DC/DC converter 100 in the prior art of FIG. 1, and the energy stored in the main choke 203 of the buck DC/DC converter 208 is discharged through the main diode 204 to the output capacitor 205 as shown in FIG. 3(a).

(2) Mode 1

Figure 3B:
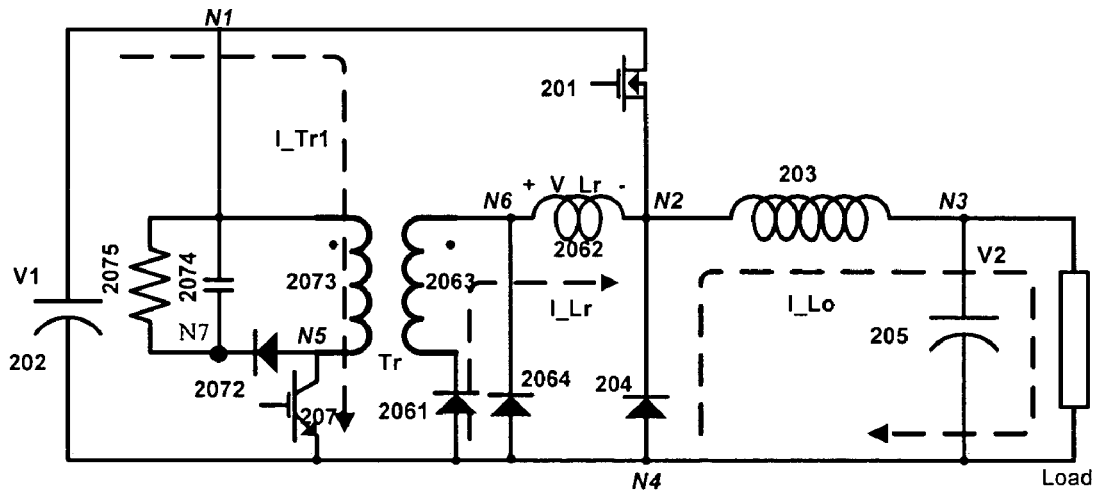

The auxiliary switch 2071 of the energy transferring circuit 207 is conducting as shown in FIG. 3(b). The auxiliary switch 2071 accomplishes a ZCS and the current on the resonant inductor 2062 of the resonant circuit 206 is increasing linearly since there is no action in the energy transferring circuit 207 before that. The main diode 204 is turned off when the current on the resonant inductor 2062 is increasing to make the current on the main diode 204 become zero, which is a ZCS, and Mode 1 is ended.

(3) Mode 2

Figure 3C:
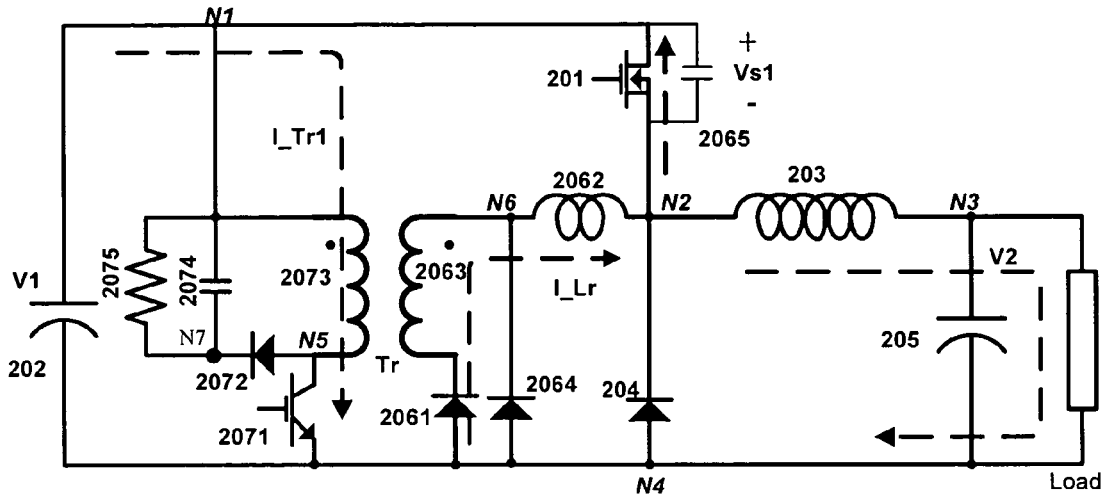

The resonant capacitor 2065 of the main switch 201 produces a resonance with the resonant inductor 2062 through the transformer Tr and the resonant diode 2061, and this resonance will let the resonant capacitor 2065 release its stored energy completely down to zero as shown in FIG. 3(c). Mode 2 is ended when the voltage across the resonant capacitor 2065 of the main switch 201 becomes zero.

(4) Mode 3

Figure 3D:
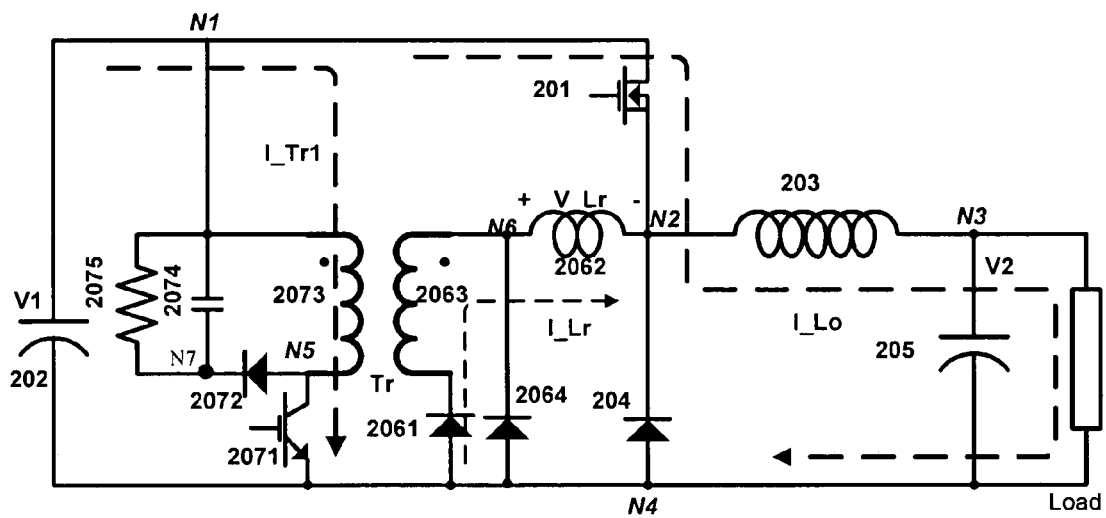

The main switch 201 is turned on when the voltage across the resonant capacitor 2065 reaches zero such that the main switch 201 accomplishes a ZVS, the energy in the resonant inductor 2062 is discharging and provided to the input capacitor 202 through the resonant diode 2061 and the secondary winding 2063 of the transformer Tr linearly, and Mode 3 is ended when the energy in the resonant inductor 2062 is released completely as shown in FIG. 3(d).

Since the primary winding 2073 of the transformer Tr of the energy transferring circuit 207 is magnetically coupled to the secondary winding 2063 of the transformer Tr of the resonant circuit 206 and the magnetizing inductance of the transformer Tr is relatively quite large, only a little amount of exciting current is left on the auxiliary switch 2071, and the auxiliary switch 2071 with a current close to zero is turned off.

(5) Mode 4

Figure 3E:
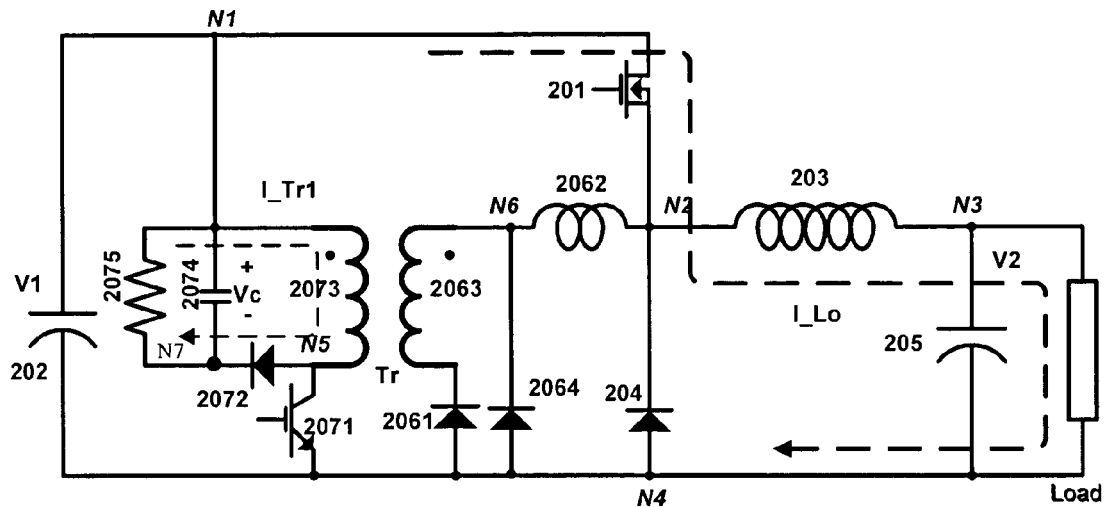

Mode 4 begins when the auxiliary switch 2071 is turned off, and the energy transferring circuit 207 is attempting to demagnetize the exciting energy of the transformer Tr, which is accomplished through the discharge of the clamping diode 2072 and the clamping capacitor 2074 as shown in FIG. 3(e). The operational principles of the main circuit of Mode 4 are the same as those of the charge mode of the aforementioned conventional PWM buck DC/DC converter 100 in the prior art.

(6) Mode 5

Figure 3F:
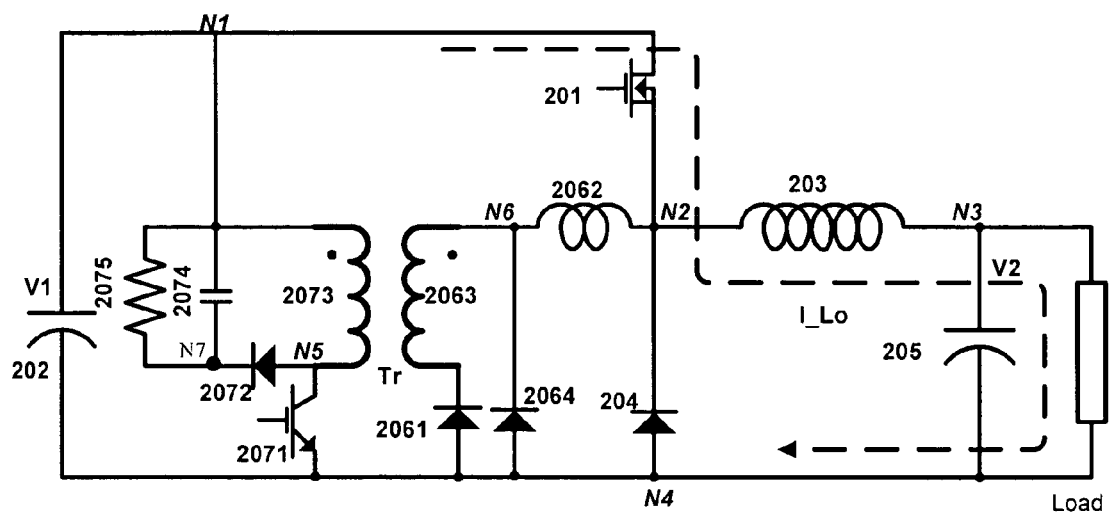

The main switch 201 is still turned on, this mode is the same as the charge mode of the aforementioned conventional PWM buck DC/DC converter 100 in the prior art, and Mode 5 is ended when the main switch 201 is turned off as shown in FIG. 3(f).

(7) Mode 6

Figure 3G:
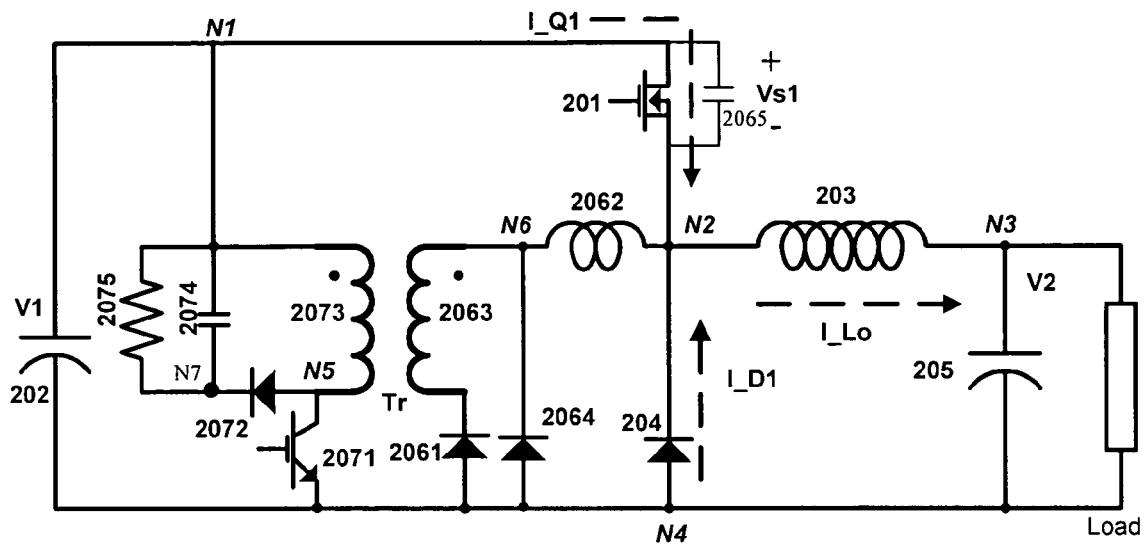
Figure 3H:
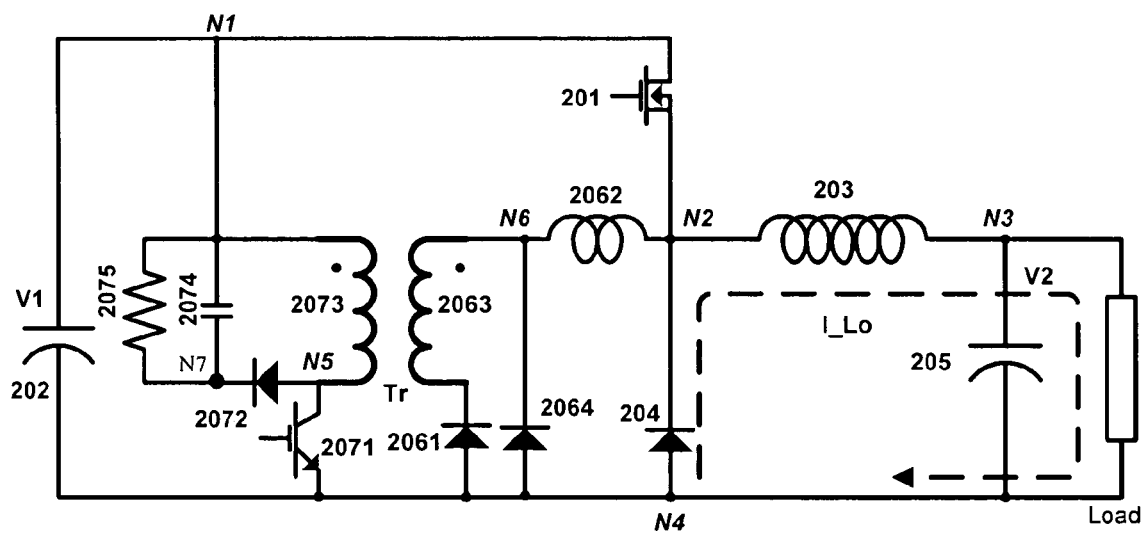

The main choke 203 of the soft-switching DC/DC converter 200 is charging the resonant capacitor 2065 of the main switch 201, the voltage across the resonant capacitor 2065 is increasing linearly, and the current flowing through the main diode 204 is also increasing linearly when the main switch 201 is turned off as shown in FIG. 3(g). The Main diode 204 is turned on completely when the current flowing through the main diode 204 equals to the output current as shown in FIG. 3(h), and the operational principles of this mode are the same as those of the discharge mode of the conventional PWM buck DC/DC converter 100 in the prior art.

(8) Waveforms of Voltages/Current of the Main Components of the Present Converter Versus Time from Mode 0 to Mode 6

Figure 4:
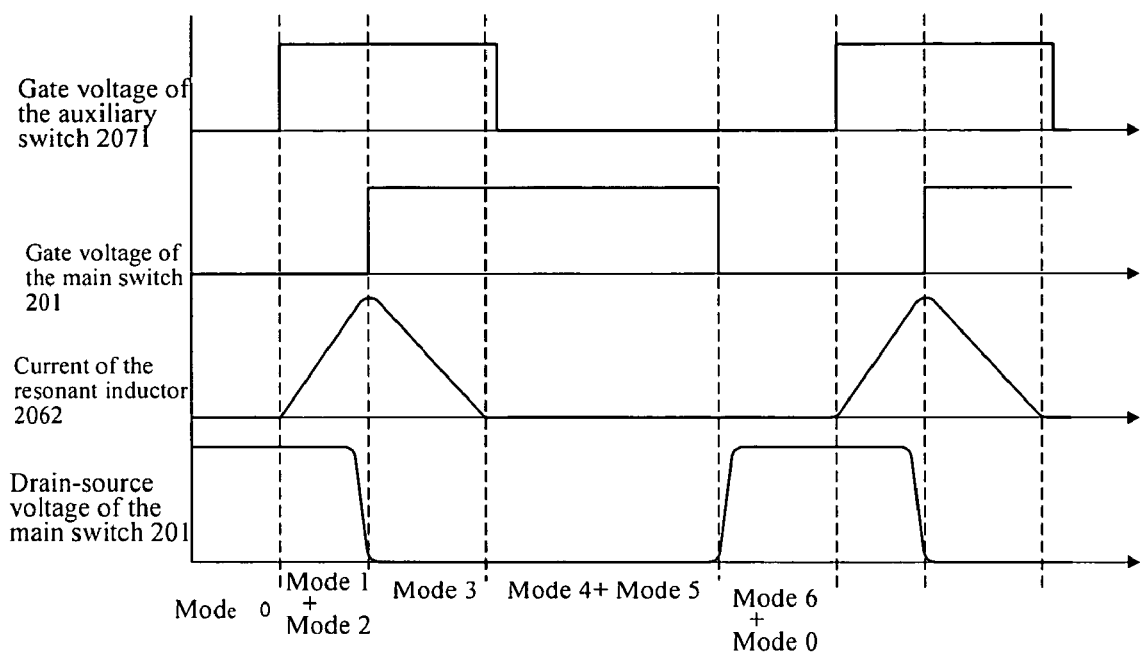
FIG. 4 shows the waveforms of the gate voltage of the auxiliary switch 2071, the gate voltage of the main switch 207, the current of the resonant inductor 2062 and the drain-source voltage of the main switch 201 versus time from Mode 0 to Mode 6 of the first preferred embodiment of the present invention respectively.

Please refer to FIG. 4, which shows the waveforms of the gate voltage of the auxiliary switch 2071, the gate voltage of the main switch 201, the current of the resonant inductor 2062 and the drain-source voltage of the main switch 201 versus time from Mode 0 to Mode 6 respectively. In FIG. 4, the time interval of Mode 6+Mode 0 shows that the waveforms vary from Mode 6 back to Mode 0 again and a new cycle begins.

If the auxiliary switch 2071 of the energy transferring circuit 207 is turned off before the end of Mode 3, the flywheel diode 2064 of the resonant circuit 206 will offer another energy releasing path for the resonant inductor 2062, and the flywheel diode 2064 could be omitted under normal circumstances.

Figure 5:
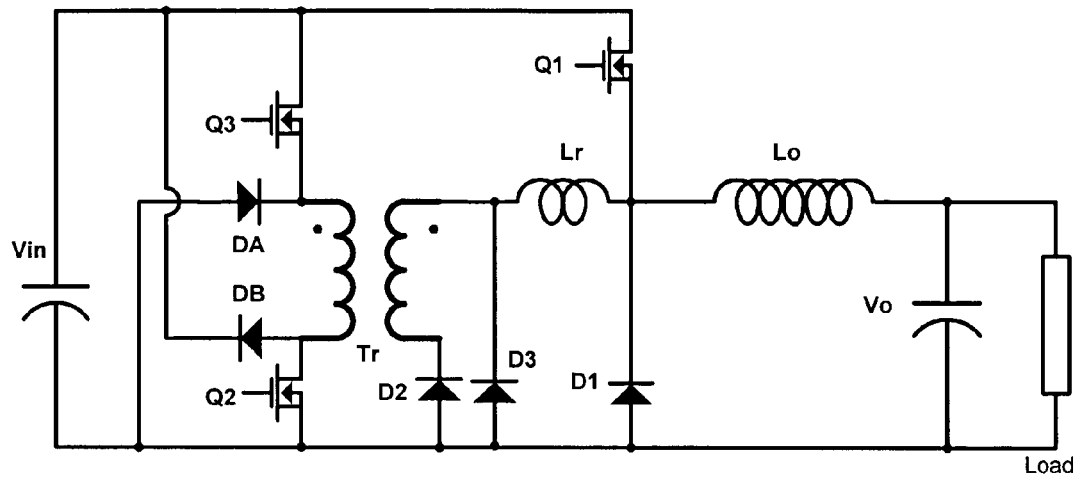
FIG. 5 is the schematic circuit diagram of the second preferred embodiment of the soft-switching DC/DC converter of the present invention.

Please refer to FIG. 5, which shows the schematic circuit diagram of the second preferred embodiment of the soft-switching DC/DC converter of the present invention. The difference between FIG. 5 and FIG. 2 is that the energy transferring circuit 207 of the first preferred embodiment of the soft-switching DC/DC converter 200 is replaced by a dual switch forward DC-DC converter including transistors Q2 and Q3 and diodes DA and DB.

Figure 6:
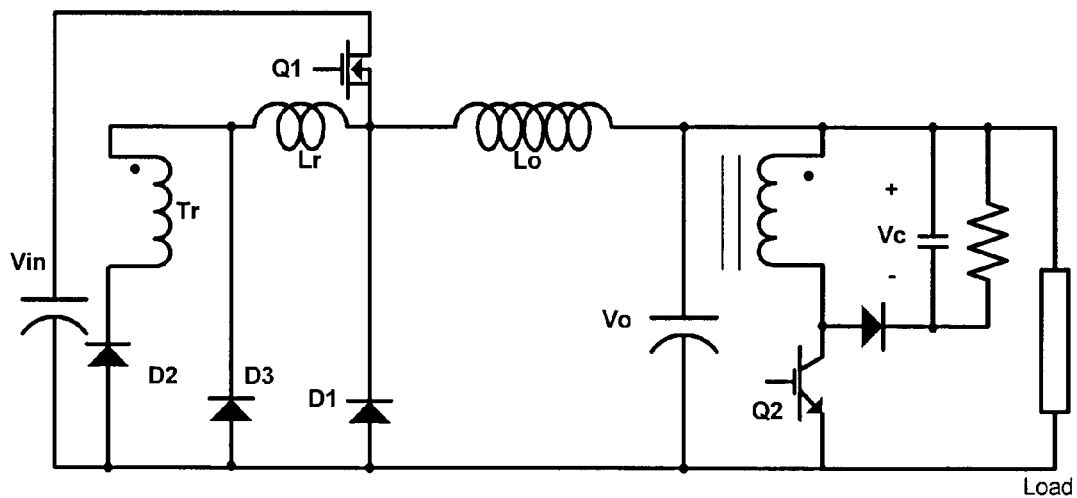
FIG. 6 is the schematic circuit diagram of the third preferred embodiment of the soft-switching DC/DC converter of the present invention.

Please refer to FIG. 6, which shows the schematic circuit diagram of the third preferred embodiment of the soft-switching DC/DC converter of the present invention. The difference between FIG. 6 and FIG. 2 is that the energy transferring circuit 207 of the first preferred embodiment of the soft-switching DC/DC converter 200 is moved and electrically connected to the load in parallel.

Figure 7A:
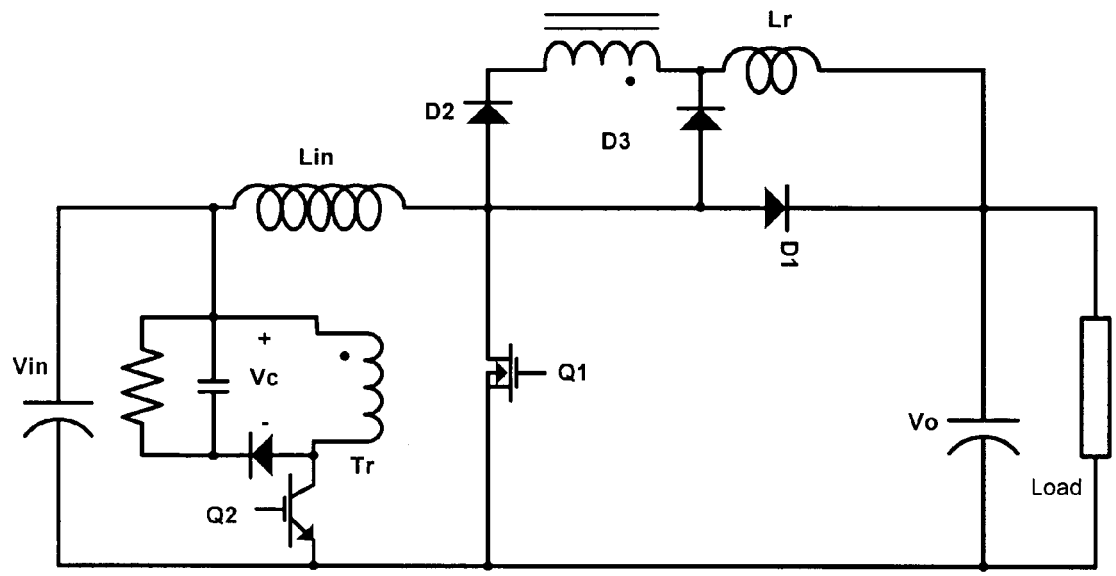
FIGS. 7(a) and 7(b) are the schematic circuit diagrams of the fourth preferred embodiment of the soft-switching DC/DC converter of the present invention.
Figure 7B:
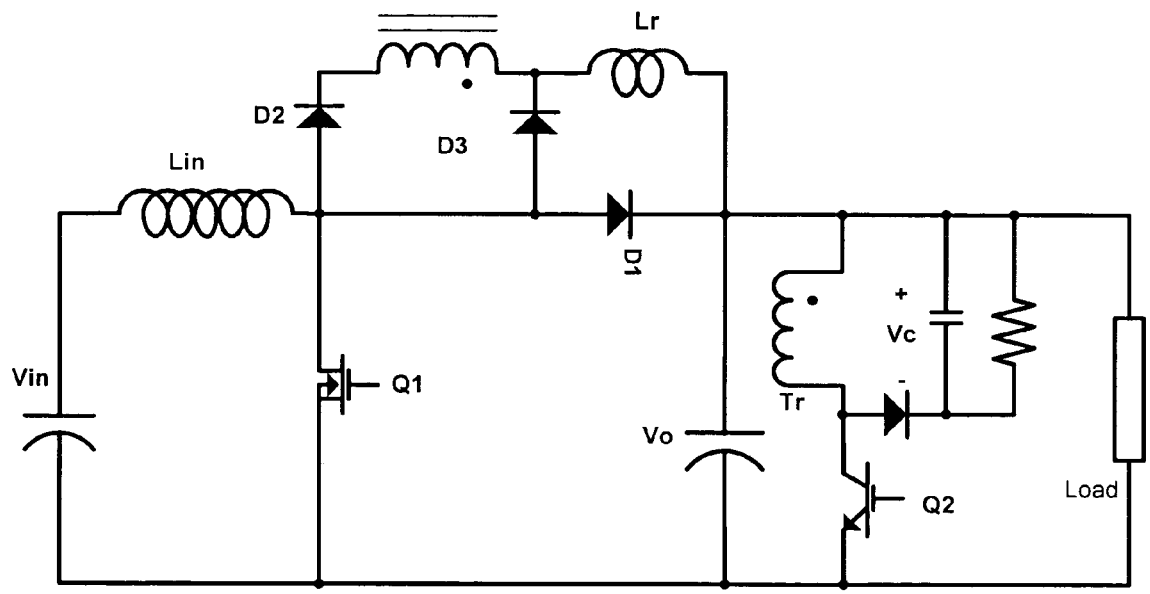

Please refer to FIGS. 7(a) and 7(b), which are the schematic circuit diagrams of the fourth preferred embodiment of the soft-switching DC/DC converter of the present invention. Therein, the difference between FIG. 7(a) and FIG. 2 is that the boost DC/DC converter replaces the buck DC/DC converter 208 of the first preferred embodiment of the soft-switching DC/DC converter 200. Besides, the difference between FIG. 7(b) and FIG. 7(a) is that the energy transferring circuit 207 of FIG. 7(a) is moved and electrically connected to the load in parallel.

Figure 8A:
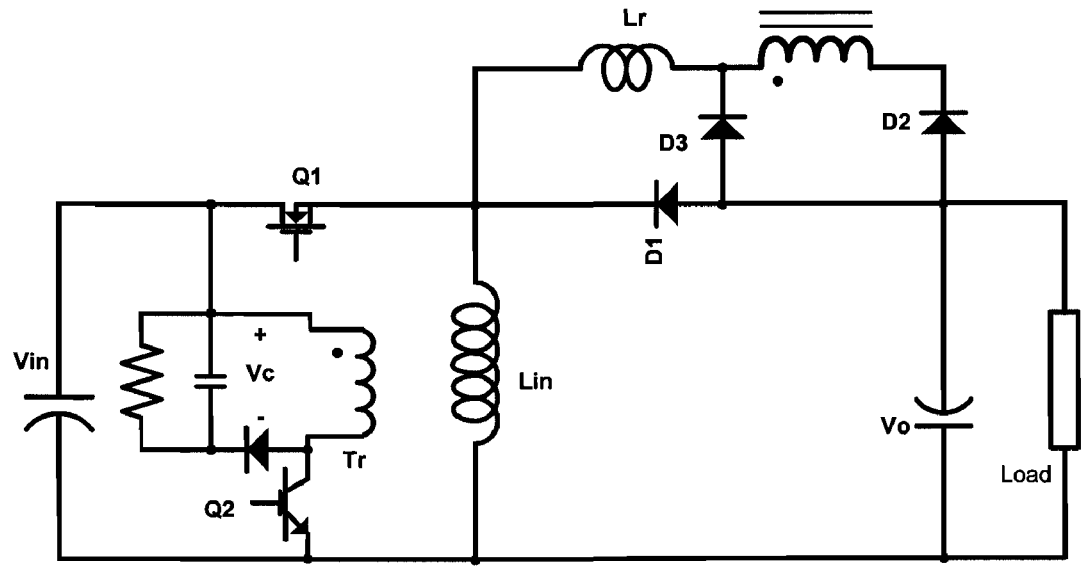
FIGS. 8(a) and 8(b) are the schematic circuit diagrams of the fifth preferred embodiment of the soft-switching DC/DC converter of the present invention.
Figure 8B:
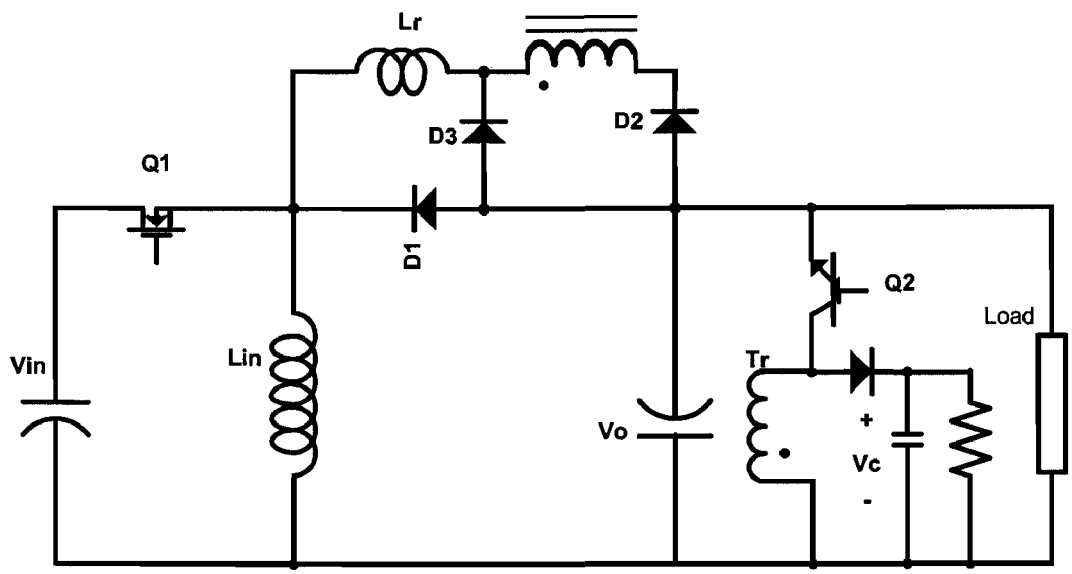

Please refer to FIGS. 8(a) and 8(b), which are the schematic circuit diagrams of the fifth preferred embodiment of the soft-switching DC/DC converter of the present invention. Therein, the difference between FIG. 8(a) and FIG. 2 is that the buck DC/DC converter 208 of the first preferred embodiment of the soft-switching DC/DC converter 200 is replaced by the buck-boost DC/DC converter. Besides, the difference between FIG. 8(b) and FIG. 8(a) is that the energy transferring circuit 207 of FIG. 8(a) is moved and electrically connected to the load in parallel.

Figure 9:
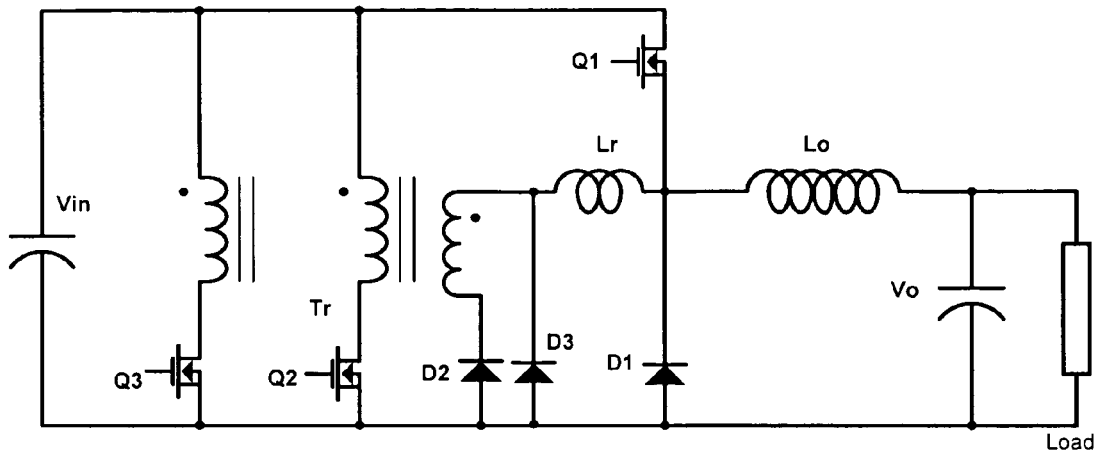
FIG. 9 is the schematic circuit diagram of the sixth preferred embodiment of the soft-switching DC/DC converter of the present invention.

Please refer to FIG. 9, which shows the schematic circuit diagram of the sixth preferred embodiment of the soft-switching DC/DC converter of the present invention. The difference between FIG. 9 and FIG. 2 is that a push-pull DC/DC converter replaces the energy transferring circuit 207 of the first preferred embodiment of the soft-switching DC/DC converter 200.

Figure 10:
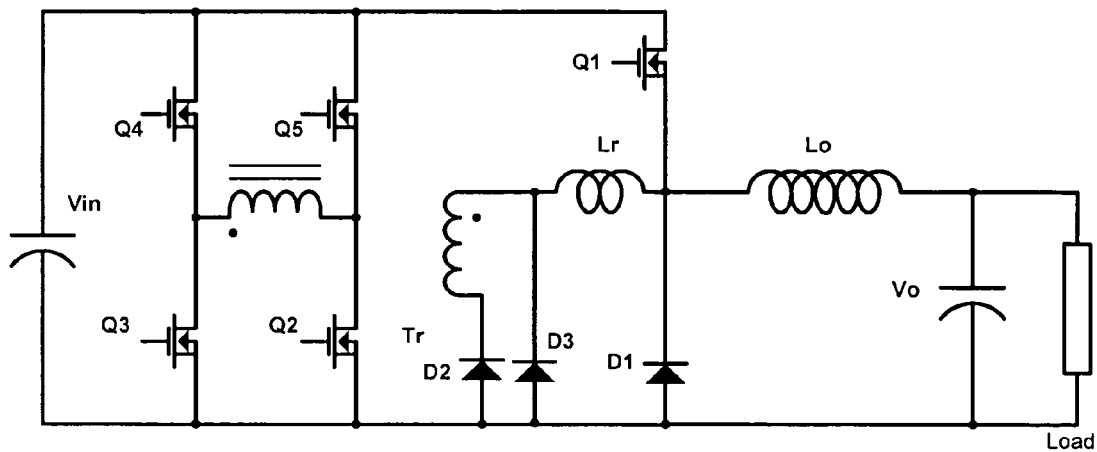
FIG. 10 is the schematic circuit diagram of the seventh preferred embodiment of the soft-switching DC/DC converter of the present invention.

Please refer to FIG. 10, which shows the schematic circuit diagram of the seventh preferred embodiment of the soft-switching DC/DC converter of the present invention. The difference between FIG. 10 and FIG. 2 is that the energy transferring circuit 207 of the first preferred embodiment of the soft-switching DC/DC converter 200 is replaced by a full-bridge DC-DC converter.

According to the above descriptions, the main features of the proposed soft-switching DC/DC converter are that a resonant circuit is employed and a resonance of the resonant circuit would let the main switch of the DC/DC converter circuit accomplish a ZVS and the auxiliary switch of the energy transferring circuit accomplish a switching, which is very close to the ZCS.

Thus, a soft-switching DC/DC converter having relatively better effectiveness is proposed in the present invention and has the following advantages over those soft-switching DC/DC converters in the prior art: decreasing the switching losses and the EMI/RFI of the proposed converter relatively.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present invention which is defined by the appended claims.

What is claimed is:

1. A soft-switching DC/DC converter, comprising:
   a converter circuit comprising a main switch having a first, a second and a control terminals for converting an input DC voltage to an output DC voltage;
   a resonant circuit comprising a secondary winding of a transformer having a first and a second terminals, a resonant inductor having a first and a second terminals, a resonant diode having an anode and a cathode and a flywheel diode having an anode and a cathode, wherein said first terminal of said secondary winding is electrically connected to said cathode of said flywheel diode and said first terminal of said resonant inductor, said second terminal of said secondary winding is electrically connected to said cathode of said resonant diode, said second terminal of said resonant inductor is electrically connected to said converter circuit, and said anode of said resonant diode is electrically connected to said anode of said flywheel diode and said converter circuit; and
   an energy transferring circuit comprising an auxiliary switch having a first, a second and a control terminals and magnetically coupled to said resonant circuit,
   wherein said main switch is turned on under a specific voltage across said first and said second terminals of said main switch and said auxiliary switch is turned off under a specific current flowing through said first and said second terminals of said auxiliary switch both controlled by said resonant circuit through a resonance effect so as to accomplish a soft-switching of said converter.

2. The converter according to claim 1, wherein said main switch comprises a transistor.

3. The converter according to claim 1, wherein said auxiliary switch comprises a transistor.

4. The converter according to claim 1, wherein said converter circuit comprises a buck converter.

5. The converter according to claim 4, wherein said buck converter comprises said main switch, an input capacitor having a first and a second terminals, an inductor having a first and a second terminals, a diode having an anode and a cathode and an output capacitor having a first and a second terminals, said first terminal of said main switch is electrically connected to said first terminal of said input capacitor, said first terminal of said inductor is electrically connected to said second terminal of said main switch, said second terminal of said resonant inductor and said cathode of said diode, said second terminal of said inductor is electrically connected to said first terminal of said output capacitor, and said anode of said diode is electrically connected to said anode of said resonant diode and said second terminals of said input and said output capacitors.

6. The converter according to claim 1, wherein said converter circuit comprises a boost converter.

7. The converter according to claim 6, wherein said boost converter comprises said main switch, an input capacitor having a first and a second terminals, an inductor having a first and a second terminals, a diode having an anode and a cathode and an output capacitor having a first and a second terminals, said first terminal of said inductor is electrically connected to said first terminal of said input capacitor, said first terminal of said main switch is electrically connected to said second terminal of said inductor, said anode of said resonant diode and said anode of said diode, said second terminal of said main switch is electrically connected to said second terminals of said input and said output capacitors, and said cathode of said diode is electrically connected to said first terminal of said output capacitor and said second terminal of said resonant inductor.

8. The converter according to claim 1, wherein said converter circuit comprises a buck-boost converter.

9. The converter according to claim 8, wherein said buck-boost converter comprises said main switch, an input capacitor having a first and a second terminals, an inductor having a first and a second terminals, a diode having an anode and a cathode and an output capacitor having a first and a second terminals, said first terminal of said main switch is electrically connected to said first terminal of said input capacitor, said first terminal of said inductor is electrically connected to said second terminal of said main switch, said second terminal of said resonant inductor and said cathode of said diode, said second terminal of said inductor is electrically connected to said second terminal of said input capacitor and said first terminal of said output capacitor, and said anode of said diode is electrically connected to said second terminal of said output capacitor and said anode of said resonant diode.

10. The converter according to claim 1 further comprising a first and a second input terminals, a first and a second output terminals and said transformer having a primary winding with a first and a second terminals, wherein said first terminal of said main switch is electrically connected to said first input terminal, and said converter circuit is electrically connected to said second input terminal and said first and said second output terminals.

11. The converter according to claim 10, wherein said energy transferring circuit further comprises said primary winding of said transformer, a clamping diode having an anode and a cathode, a clamping capacitor having a first and a second terminals and a discharging resistor having a first and a second terminals, said first terminal of said discharging resistor is electrically connected to said first input terminal, said first terminal of said clamping capacitor and said first terminal of said primary winding, said second terminal of said discharging resistor is electrically connected to said second terminal of said clamping capacitor and said cathode of said clamping diode, said anode of said clamping diode is electrically connected to said first terminal of said auxiliary switch and said second terminal of said primary winding, and said second terminal of said auxiliary switch is electrically connected to said second input and said second output terminals of said converter.

12. The converter according to claim 10, wherein said energy transferring circuit comprises a dual switch forward DC/DC converter.

13. The converter according to claim 12, wherein said dual switch forward DC/DC converter comprises a pair of switches, a first switch being said auxiliary switch and a second switch having a first, a second and a control terminals, a first diode having an anode and a cathode, a second diode having an anode and a cathode and said primary winding of said transformer, said anode of said first diode is electrically connected to said second terminal of said first switch and said second input and said second output terminals of said converter, said cathode of said first diode is electrically connected to said second terminal of said second switch and said first terminal of said primary winding, said second terminal of said primary winding is electrically connected to said anode of said second diode and said first terminal of said first switch, and said cathode of said second diode is electrically connected to said first input terminal of said converter and said first terminal of said second switch.

14. The converter according to claim 10, wherein said energy transferring circuit is electrically connected to said first and said second output terminals of said converter in parallel.

15. The converter according to claim 1, wherein said energy transferring circuit comprises a push-pull DC/DC converter.

16. The converter according to claim 1, wherein said energy transferring circuit comprises a full-bridge DC/DC converter.

17. The converter according to claim 1, wherein said specific voltage is zero volt.

18. The converter according to claim 1, wherein said specific current is one close to zero amp.

19. A soft-switching DC/DC converter, comprising:
a converter circuit comprising a main switch having a first, a second and a control terminals for converting an input DC voltage to an output DC voltage;
a resonant circuit comprising a secondary winding of a transformer having a first and a second terminals, a resonant inductor having a first and a second terminals, a resonant diode having an anode and a cathode and a flywheel diode having an anode and a cathode, wherein said first terminal of said secondary winding is electrically connected to said cathode of said flywheel diode and said first terminal of said resonant inductor, said second terminal of said secondary winding is electrically connected to said cathode of said resonant diode, said second terminal of said resonant inductor is electrically connected to said converter circuit, and said anode of said resonant diode is electrically connected to said anode of said flywheel diode and said converter circuit; and
an energy transferring circuit comprising an auxiliary switch magnetically coupled to said resonant circuit,
wherein said main switch is turned on under a specific voltage and said auxiliary switch is turned off under a specific current both controlled by said resonant circuit through a resonance effect so as to accomplish a soft-switching of said converter.

* * * * *